United States Patent
Bayer et al.

(10) Patent No.: US 6,398,468 B1
(45) Date of Patent: Jun. 4, 2002

(54) MACHINE TOOL QUILL SPINDLE

(75) Inventors: Jack L. Bayer, Phoenix; Scott L. Bayer, Scottsdale; John D. Philippi, Gilbert, all of AZ (US)

(73) Assignee: Bayer Machine Tech LLC, Phoenix, AZ (US)

( * ) Notice: Subject to any disclaimer, the term of this patent is extended or adjusted under 35 U.S.C. 154(b) by 0 days.

(21) Appl. No.: 09/766,434

(22) Filed: Jan. 19, 2001

(51) Int. Cl.$^7$ ................................................ B23Q 11/10
(52) U.S. Cl. ...................... 409/135; 384/493; 408/56; 409/231; 409/233
(58) Field of Search ........................... 409/135, 231, 409/233; 408/57; 384/493, 905, 501; 184/6, 22; 310/58

(56) References Cited

U.S. PATENT DOCUMENTS

| | | | |
|---|---|---|---|
| 3,741,572 A | 6/1973 | Nemoto et al. ............... | 279/50 |
| 3,955,471 A | 5/1976 | Frazier ......................... | 90/11 |
| 4,137,997 A | * 2/1979 | Ando .......................... | 184/622 |
| 5,242,360 A | 9/1993 | Bayer ......................... | 483/36 |
| 5,798,587 A | * 8/1998 | Lee ............................. | 310/58 |
| 6,158,895 A | * 12/2000 | Date ........................... | 384/493 |

FOREIGN PATENT DOCUMENTS

| | | | | |
|---|---|---|---|---|
| JP | 64-87130 | * | 3/1989 | ................ 409/231 |
| JP | 40-3213243 | * | 9/1991 | ................ 409/231 |
| JP | 60-313585 | * | 2/1994 | ................ 409/231 |
| JP | 40-9317778 | * | 12/1997 | ................ 409/231 |
| JP | 41-58277 | * | 3/1998 | ................ 409/231 |
| JP | 41-1019848 | * | 1/1999 | ................ 409/231 |
| JP | 2000-158288 | * | 6/2000 | ................ 409/135 |

* cited by examiner

Primary Examiner—William Briggs
(74) Attorney, Agent, or Firm—Quarles & Brady Streich Lang; Paul D. Amrozowicz, Esq.

(57) ABSTRACT

A quill spindle includes a quill assembly within which a spindle assembly is rotationally mounted. The quill assembly includes a coolant flow path, and the spindle assembly includes a plurality of coolant flow paths. The quill assembly flow path and one of the plurality of spindle assembly flow paths provide cooling to bearings that allow the rotation of the spindle assembly within the quill assembly. Another of the plurality of coolant flow paths within the spindle assembly provides cooling flow to a cutting tool installed on an end of the quill spindle.

44 Claims, 6 Drawing Sheets

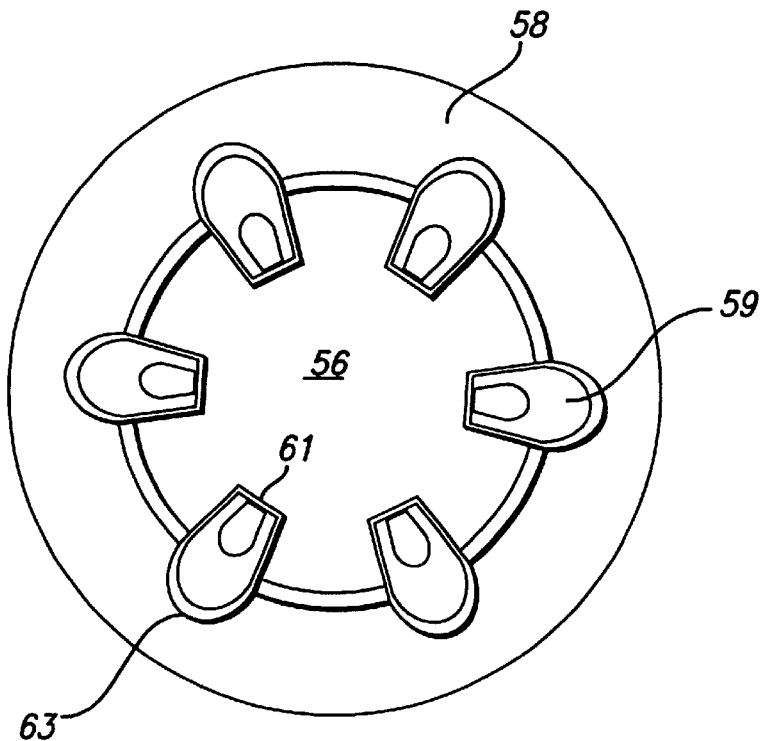
FIG. 3
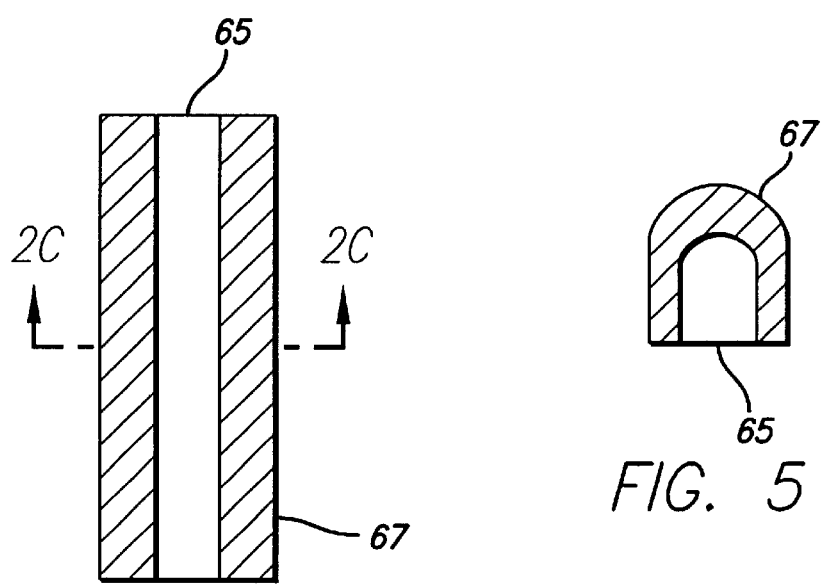
FIG. 4
FIG. 5

MACHINE TOOL QUILL SPINDLE

BACKGROUND OF THE INVENTION

1. Field of the Invention

The present invention relates to machine tool spindles. More particularly, the present invention relates to an improved machine tool quill spindle, and an adjustable quill bearing assembly for holding the machine tool quill spindle.

2. Description of Related Art

Machine tools are used extensively to mill various metal workpieces according to design specifications. Machine tools typically include a table for holding the workpiece, a cutting tool for treating the workpiece, and a rotationally mounted spindle for holding and rotating the cutting tool being used to treat the workpiece.

Generally, there are two types of machine tool spindles, the ram head spindle and the quill spindle. The ram head spindle is fixed to the machine tool head, which is a heavy metal casting. Head motion is used to move the ram head spindle parallel to the spindle centerline. The quill spindle is supported by the machine tool head, but is moved parallel to the spindle centerline relative to the head. The quill spindle consists of a rotating shaft, called the spindle, that is surrounded by a tubular housing, called the quill.

The quill spindle provides advantages over the ram head spindle. First, the quill spindle weight is significantly less than the ram head and spindle weight. Thus, the quill can accelerate at a much greater rate, and thus with less reaction force. Moreover, the quill spindle is smaller than the ram head spindle and can, therefore, project cutting tools into smaller openings. These advantages initially led to predominant use of quill spindles in the machine tool industry. However, this has not been the case in more recent years. This is because the quill spindle also suffers a major disadvantage relative to the ram head spindle. Specifically, spindle rotation speeds have increased over the years, and the increased speeds result in more heat being generated within the spindle. This heat causes the quill to expand and interfere with the quill bearings that support the quill in the head. This interference results in restrictive axial motion during the cutting process, which results in unacceptable work pieces being produced. Additionally, the spindle bearings are excessively and unevenly heated at these high rotation speeds, which places the spindle bearings under load due to uneven expansion of the bearing assemblies.

Thus, there is a need in the art for a lightweight machine tool quill spindle that remains sufficiently cool during high speed rotational motion so that unintentional restrictive axial movement of the quill spindle does not occur during the cutting process, and so that the bearings are not excessively and unevenly heated at high rotational speeds.

There is also a need in the art for a quill bearing assembly that sufficiently retains and stabilizes a machine tool quill spindle assembly within the head of a machine tool, that does not cause restrictive axial motion of the quill spindle assembly during high speed operation due to thermal expansion of the quill spindle assembly.

SUMMARY OF THE INVENTION

The present invention is a machine tool quill spindle assembly that remains cool during high speed rotational motion of the spindle. The machine tool quill spindle assembly holds machine tool cutting tools, and includes a quill assembly and a spindle assembly rotationally mounted within the quill assembly. A plurality of first coolant flow paths extend axially within and through the spindle assembly to allow a cooling fluid to circulate within and through the spindle assembly.

Another aspect of the present invention is an adjustable quill bearing for retaining and stabilizing the machine tool quill spindle assembly in a head assembly that has a generally cylindrical central bore for receiving the machine tool quill spindle assembly therein. The adjustable quill bearing includes substantially cylindrical upper and lower bearing portions. Each of these upper and lower bearing portions includes a substantially tapered elongate portion for mating with a substantially tapered elongate portion formed in upper and lower portions, respectively, of the head assembly, and a groove in an inner portion of the tapered elongate portion. A resilient, self-lubricating bearing material is mounted within each of the grooves, and provides a frictional interference fit between the head assembly and the machine tool quill spindle.

BRIEF DESCRIPTION OF THE DRAWINGS

FIG. 3 is a top view of a portion of the machine tool quill spindle assembly taken along line 3—3 of FIG. 1;

FIG. 4 is a front view of a flexible key used to couple a shaft pulley assembly to a spline shaft in the machine tool quill spindle assembly of FIG. 1;

FIG. 5 is a cross section view of the flexible key of FIG. 3, taken along line 2C—2C of FIG. 4;

DETAILED DESCRIPTION OF THE INVENTION

Figure 1:
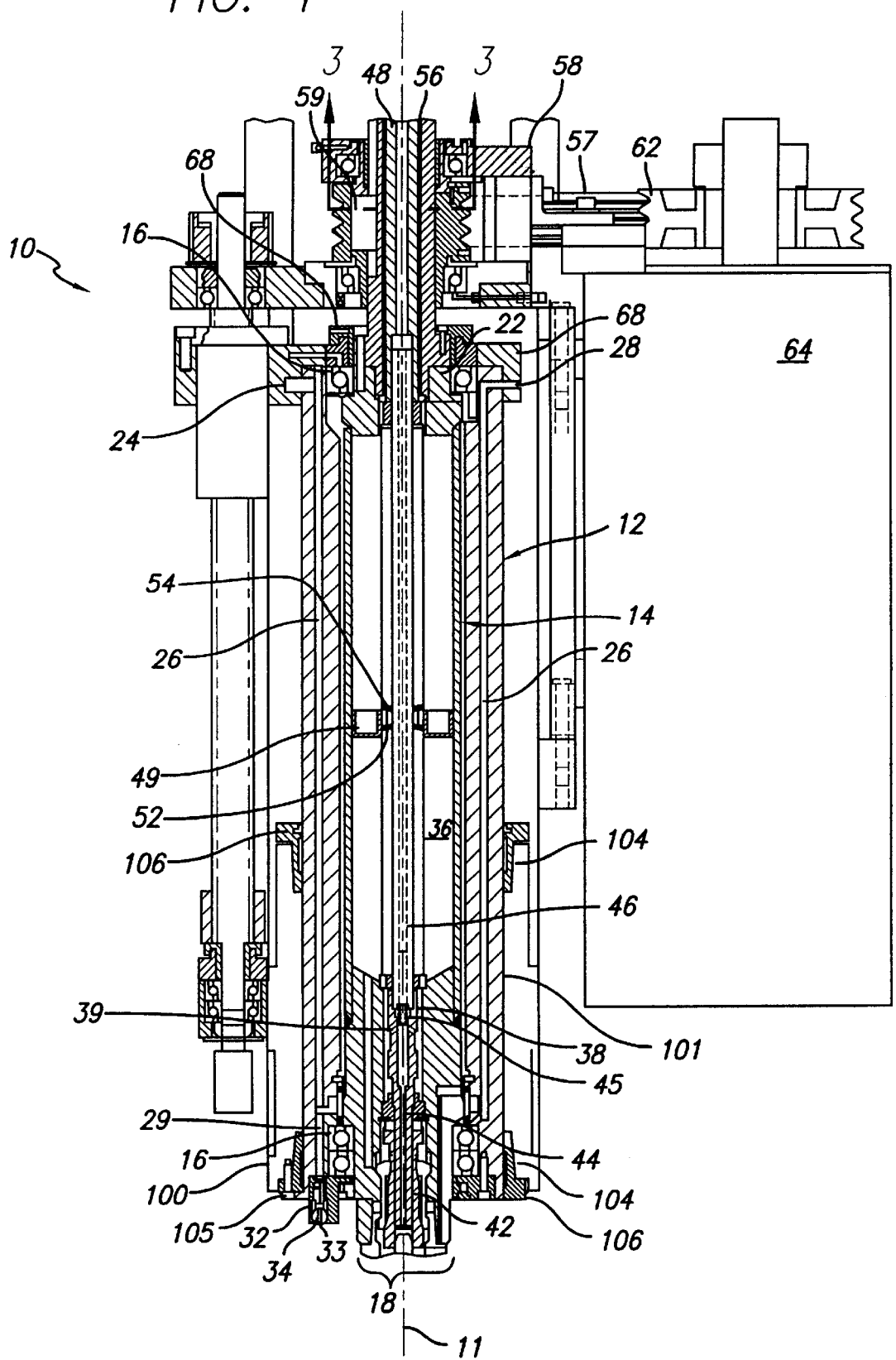
FIG. 1 is a cross section view of the lower portion of a machine tool quill spindle assembly according to an embodiment of the present invention.
Figure 2:
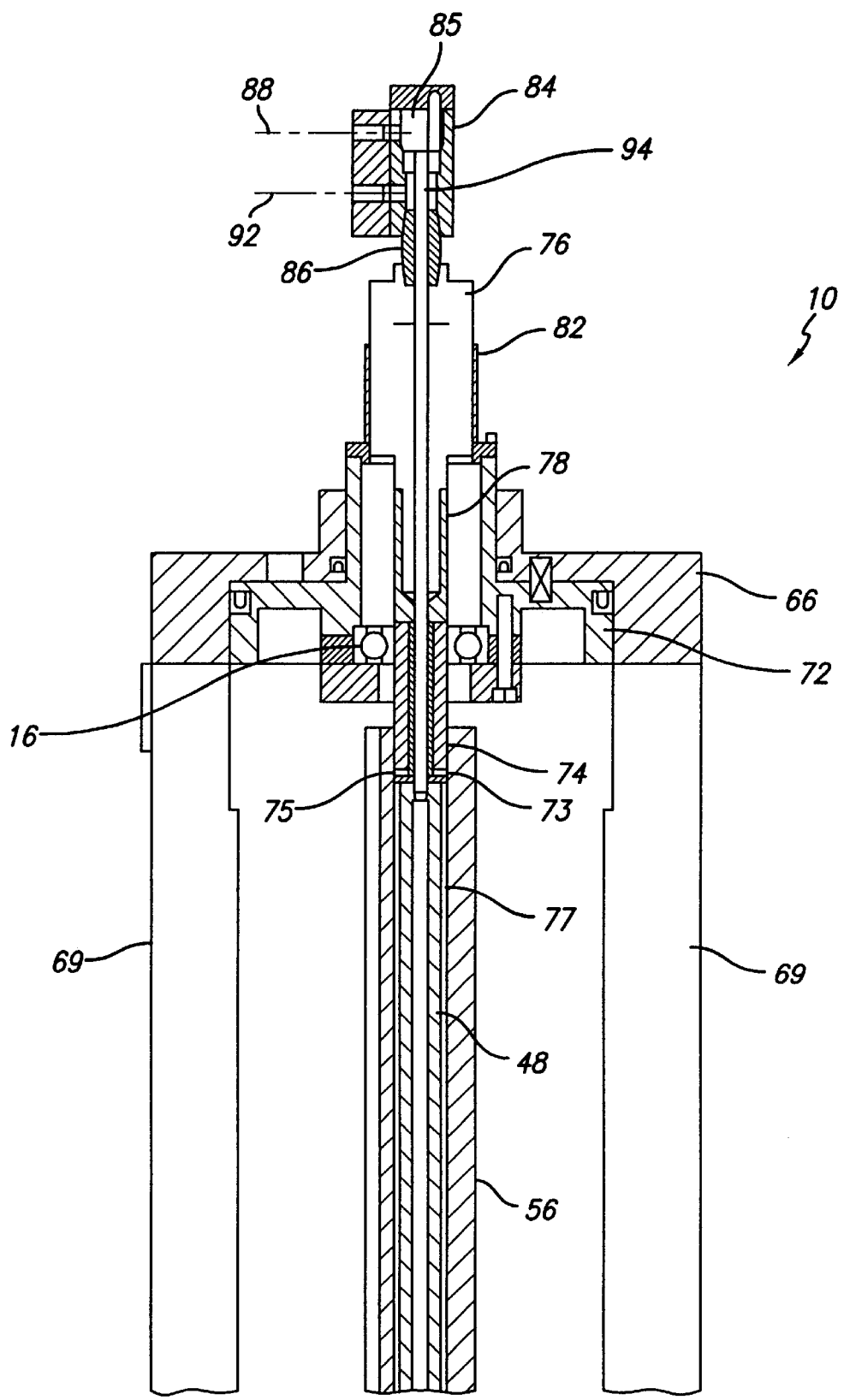
FIG. 2 is a cross section view of the upper portion of the machine tool quill spindle assembly of FIG. 1.

A cross sectional view of the lower and upper portions of a quill spindle 10 according to an embodiment of the present invention are depicted in FIGS. 1 and 2, respectively. The quill spindle 10 includes a quill assembly 12 within which a spindle assembly 14 is rotationally mounted. The spindle assembly 14 is allowed to rotate relative to the quill assembly 12 by means of a plurality of bearing assemblies 16. In the preferred embodiment, two lower bearing assemblies 16 are positioned near an end 18 of the spindle assembly 14 that receives a cutting tool (the "tool end"), and a single upper bearing assembly 16 is positioned near the opposite end 22 (the "machine end") of the spindle assembly 14. It will of course be appreciated that the number and arrangement of the bearing assemblies 16 is not limited to that depicted in FIG. 1, but may be provided in numerous and varied configurations.

The quill assembly 12 is generally tubular shaped and includes openings and various channels that comprise an internal coolant flow path. This coolant flow path includes an inlet port 24 located proximate one of the upper bearing assemblies 16 and an inlet/outlet port positioned opposite the inlet port 24, proximate the other upper bearing assembly 16. The inlet port 24 and inlet/outlet port 28 are in fluid communication with each other via a coolant channel 26 that includes portions extending axially from both the inlet port 24 and inlet/outlet port toward the tool end 18 of quill assembly 12. The coolant flow path also includes an additional channel 29 located proximate the tool end of the quill assembly 12 that extends from coolant channel 26 to a spring-loaded pressure relief valve 32 mounted within the quill assembly 12 proximate one of the lower bearing assemblies 16. An unillustrated check valve is installed in a fluid line external to the quill spindle 10, which prevents coolant flow from exiting the inlet port 24. Thus, either of the ports 24, 28 may function as a coolant inlet port; however, because of the check valve, when the inlet/outlet port 28 functions as the coolant inlet, then the inlet port 24 cannot function as a coolant outlet port. Instead, when the inlet/outlet port 28 functions as the coolant inlet, coolant pressure within the coolant channels 26, 29 builds up until it reaches the set point of the relief valve 32. Coolant then exits out the relief valve 32, via a through-hole 33 in each of a plurality of ball bearings 34. The through-hole 33 in each of the ball bearings 34 receives a pin (not illustrated), which is used to adjust the angle of the through-hole 33. Thus, when coolant exits each through-hole 33 it is directed at a desired angle toward the external portions of an installed cutting tool. If coolant is neither required, nor desired, to be sprayed toward the external portions of the cutting tool, then coolant flow is directed into inlet port 24, it then flows through coolant channel 26, and out inlet/outlet port 28. This coolant flow path will be described in more detail further below The spindle assembly 14 is also generally tubular in shape and includes an opening 36 of varying diameter extending through the spindle assembly 14 that is symmetric with respect to the spindle assembly's longitudinal centerline axis 11. A connector assembly 38, located proximate the tool end 18, is mounted within a portion of the opening 36 by a retaining ring and various seals. The connector assembly 38 includes a clamp unit 42 mounted therein, which receives an unillustrated tool holder that holds various cutting tools. As will be discussed more fully below, the connector assembly 38 also includes an opening 44 extending through it, which allows cooling fluid to flow through the connector assembly 38 and clamp unit 42 to the installed cutting tool.

Also mounted within the spindle opening 36 is a hollowed out rod assembly 46. This hollow rod assembly 46 is retained along the centerline axis 11 of the spindle opening 36 by a enter guide assembly 49 that is attached to an inner periphery portion of the spindle assembly 14. The hollow rod 46 is further threaded into the connector assembly 38 at one end and into a draw shaft 48 proximate its other end. A lower set of Belleville springs 52 and an upper set of Belleville springs 54 surround lower and upper portions of the hollow rod assembly 46, respectively. The purpose of the springs 52, 54 is to resiliently urge the unillustrated tool toward the spindle assembly 10, as is general practice in the art.

A hollow spline shaft 56 is coupled to the machine end 22 of the spindle assembly 14, and surrounds the draw shaft 48. A spline shaft pulley assembly 58 is coupled to the spline shaft 56. A belt 57 wound around the spline shaft pulley assembly 58 also extends around a spindle motor pulley assembly 62 that is coupled to a spindle motor 64. The spindle motor is mounted to the machine tool apparatus such that the spindle motor pulley assembly 62 is in the same plane as the spline shaft pulley assembly 58. Thus, rotation of the spindle motor 64 causes the spline shaft 56, and thus the spindle assembly 14, to rotate.

As illustrated more particularly in FIG. 3, the spline shaft pulley assembly 58 is coupled to the spline shaft 56 using a plurality of keys 59. More particularly, each key 59 fits within individual slots 61, 63 formed in the spline shaft 56 and spline shaft pulley 58, respectively. The keys 59, as depicted more particularly in FIGS. 4 and 5, include a central portion 65 formed of a material such as polyurethane rubber, that is partially surrounded by a strength providing body portion 67 formed of a material such as nylon. The flexible nature of the material allows each key 59 to deflect and thus equalize the rotational load from the spline shaft pulley assembly 58 to the spline shaft 56. Therefore, unwanted vibrations of the spline shaft 56, and thus the spline assembly 14 and an installed cutting tool, are precluded even if the centerline of rotation of the spline shaft 56 and the centerline of rotation of the spline shaft pulley 58 are not perfectly aligned. It will be appreciated that polyurethane rubber and nylon are only exemplary materials used in a preferred embodiment of the present invention, and that other materials may also be used.

Turning now to FIG. 2, the upper portion of the quill spindle 10 will be discussed. A clamp assembly 66 extends from an upper end of the spline shaft 56 and is bolted to a spindle cap 67 (see FIG. 1), which is in turn held in place by a spline ring 68 (see also FIG. 1) that is bolted to the spline assembly 14. The clamp assembly 66 includes a plurality of stanchions 69, which allows the belt 57 to pass to and around the spline shaft pulley assembly 58 without interference. A second assembly 72 is connected to the underside of the clamp assembly 66. This assembly 72 supports yet another bearing assembly 16, which in turn rotationally supports a first coupling tube 74. A rotary seal assembly 76, which will be discussed in more detail further below, is connected to the first coupling tube 74, via a second coupling tube 78 mounted within the rotary seal assembly 76. The rotary seal assembly 76 is stabilized by a rotary seal bracket 82, which surrounds an outer peripheral portion of the rotary seal assembly 76, and that is connected to the second assembly 72. An adapter assembly 84 is coupled to an end of the rotary seal assembly 76 via a nipple 86. The adapter assembly 84 includes two openings extending from an outer periphery of the adapter assembly 84 into a hollow internal portion 85 thereof. These two openings include a high/low pressure inlet/outlet port 88, and a low pressure inlet port 92, which receive and discharge coolant, at specified relative coolant pressures (e.g., high pressure and low pressure), that circulates within and through the spindle assembly 14. This coolant flow will be discussed in more detail further below. Yet another hollow tube 94, non-rotationally supported at one end in the adapter assembly 84, extends through the rotary seal assembly 76, the second coupling tube 78 and the first coupling tube 74, and is sealingly fitted into the end of the draw shaft 48.

Figure 6:
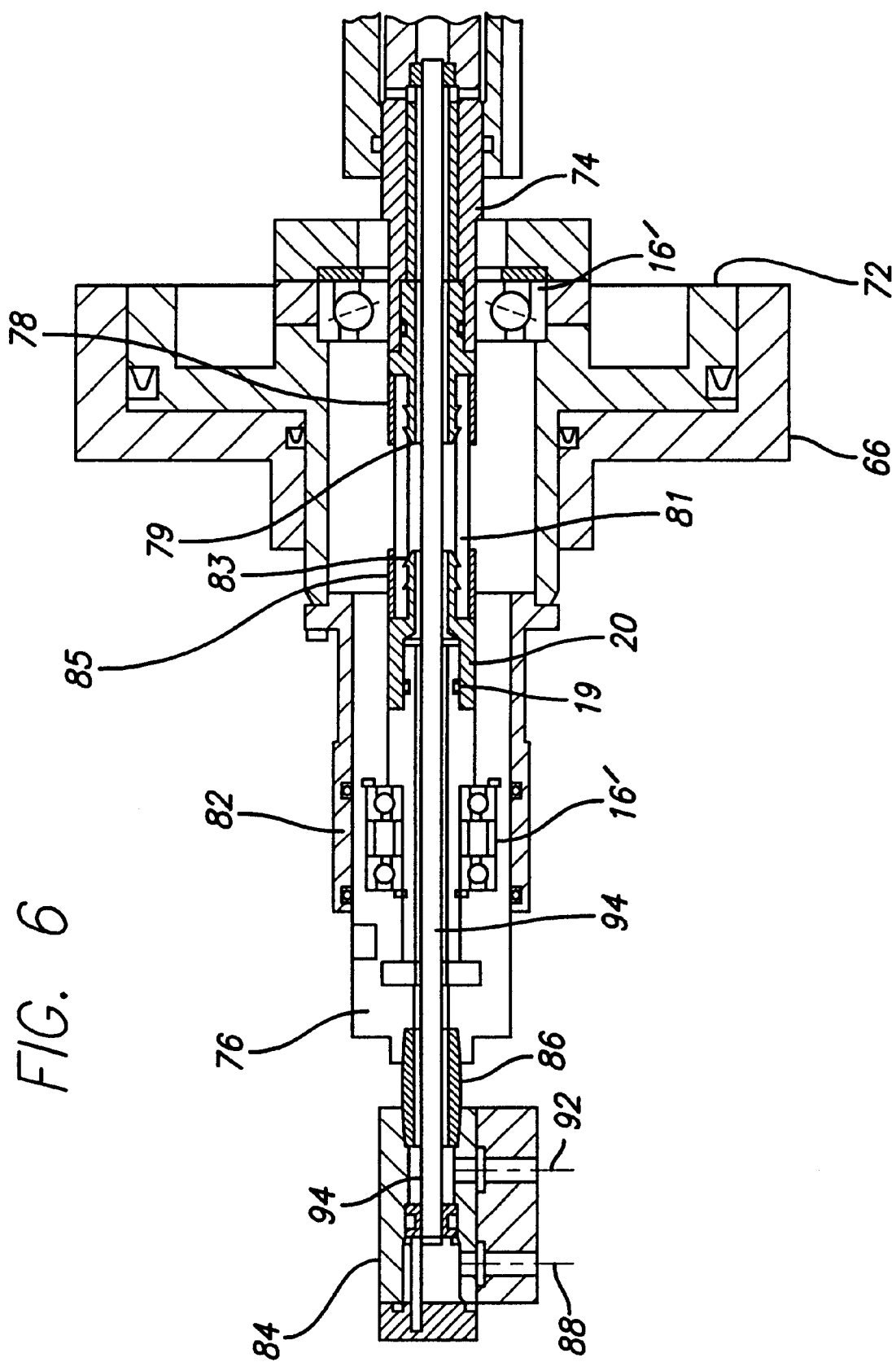
FIG. 6 is a cross section view of a rotary seal assembly used in in the machine tool quill spindle assembly of FIG. 1.

With reference now to FIG. 6, a more detailed description of the internal portions of the rotary seal assembly 76 will be provided. As shown more explicitly therein, the coupling tube 78 includes a barbed portion 79 on one of its ends. A flexible coupling tube 81 surrounds the tube 94 and is fitted at one end around the barbed portion 79. The other end of the flexible coupling tube 81 is fitted around a barbed portion 83 located on an end of another tube 85. This tube 85 also surrounds the tube 94, and is rotationally supported within the rotary seal assembly 76 by a dual bearing assembly 16'.

The remaining portions of the rotary seal assembly 76 are the same as that depicted in FIG. 2, with like reference numerals being used for like parts. By using the flexible coupling tube 81, the rotary seal assembly 76 is not directly mounted to the spline shaft 56, or to other parts that are directly mounted thereto. As a result, vibration that may be caused by run out between the rotary seal assembly 76 and the spline shaft 56 is significantly reduced. Thus, the likelihood of any such vibrations being coupled to the cutting tool is significantly reduced, and in most cases is eliminated.

Figure 7:
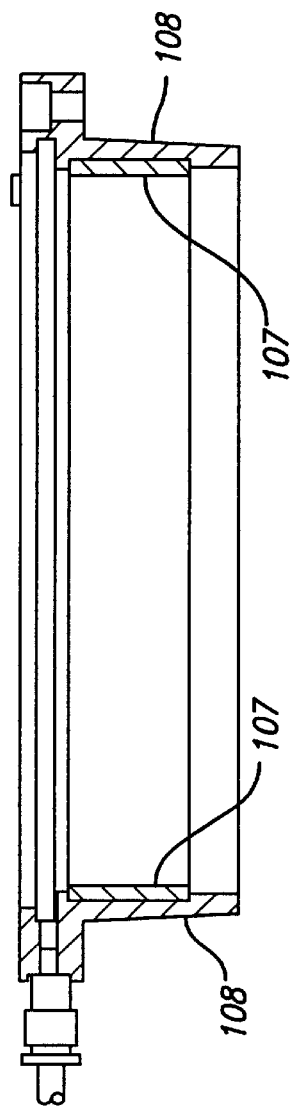
FIG. 7 is a cross section of a quill bearing assembly which supports the machine tool quill spindle assembly of FIG. 1.

Returning now to FIG. 1, and with particular reference to FIG. 7, the quill bearing will now be discussed. The entire quill spindle 10 is supported in the machine tool apparatus by a head assembly 100. Specifically, the quill spindle 10 is inserted into a bore 101 of the head assembly 100, and is stabilized and held in place by an adjustable quill bearing. More particularly, the head assembly 100 includes tapered portions 104 at upper and lower ends of the bore 101, into which upper and lower head bearing portions 106 are respectively received. As shown more particularly in FIG. 7, the head bearing portions 106 each include axially extending tapered portions 108 that slide into the tapered portions 104 of the head assembly 100. A flexible ring 107, made of a low friction, self-lubricating material, such as Turcite™, or any other known material with similar properties, is bonded into a groove formed in the tapered portion 108 of the head bearing portions 106. Thus, when the head bearing portions 106 are attached to the head assembly 100, via a plurality of bolts 105, the head bearing portions 106 are pulled into respective tapered portions 104 of the bore 101 to a desired inner diameter for retaining and stabilizing the quill spindle 10. This combination of structure provides adjustability to the quill bearing and, by means of the flexible ring 107, additionally provides for some inevitable thermal expansion during quill spindle 10 operation.

As alluded to above, both the quill assembly 12 and the spindle assembly 14 include internal coolant flow paths. Each of these coolant flow paths will now be discussed in turn, beginning first with the quill assembly 12. Referring to FIG. 1, as previously noted, the coolant flow path in the quill assembly 12 includes the inlet port 24, the coolant channels 26, 29, and the inlet/outlet port 28. Whether inlet/outlet port 28 functions as a coolant inlet or outlet will depend on the desired configuration. More specifically, if coolant spray toward the external portions of an installed cutting tool is desired, then inlet/outlet port 28 will function as the coolant inlet. If not, then inlet port 24 will function as the coolant inlet and inlet/outlet port 28 will function as the coolant outlet. With the latter configuration, coolant is received into coolant inlet port 24 from an unillustrated coolant source. The coolant is circulated through coolant channel 26 and into coolant channel 29. The coolant then exits inlet/outlet port 28 and is returned to the unillustrated coolant source. With this particular coolant flow configuration, the coolant removes heat from the outer races of the upper and lower bearing assemblies 16. With the former configuration, coolant is received into inlet/outlet port 28 from the unillustrated coolant source. The coolant is circulated into coolant channel 26 and coolant channel 29 and, when pressure reaches the set point of the pressure relief valve 32, is directed out the through-holes 33 of each the plurality of ball bearings 34, at the angle set by installed pins. This coolant flow configuration provides for cooling of the installed cutting tool, in addition to removing heat from the upper and lower bearing assembly 16 outer races.

Turning now to the coolant flow in the spindle assembly 14, the spindle assembly 14 includes a plurality of coolant flow paths, termed herein as a "high pressure" flow path and a "low pressure" flow path. The high pressure flow path is generally known in the art and provides coolant flow to the installed cutting tool, if such cooling is desired. Since some cutting tools are designed to not receive coolant flow, the high pressure coolant flow path is not always utilized. Coolant flow to the high pressure coolant flow path is controlled by an unillustrated controller, which is programmed by an operator. Thus, an operator can program the controller to either provide or inhibit delivery of high pressure coolant to the high pressure coolant flow path. The low pressure flow path is always utilized during operation. This flow path provides coolant flow to various internal portions of the spindle assembly 14 and is used specifically to remove heat from upper and lower bearing assembly 16 inner races.

Having described the coolant flow paths in the spindle assembly 14 generally, these flow paths will now be described specifically. In this regard, reference should be made to FIGS. 1, 2, and 6, as well as FIG. 8. If the previously mentioned controller is programmed to deliver coolant to the high pressure coolant flow path, the high pressure coolant first enters the adapter assembly 84 through the inlet/outlet port 88. The high pressure coolant then flows through the tube 94 and into the draw shaft 48 in the spline shaft 56. The high pressure coolant then enters the spindle assembly 14 via the hollow rod assembly 46.

Figure 8:
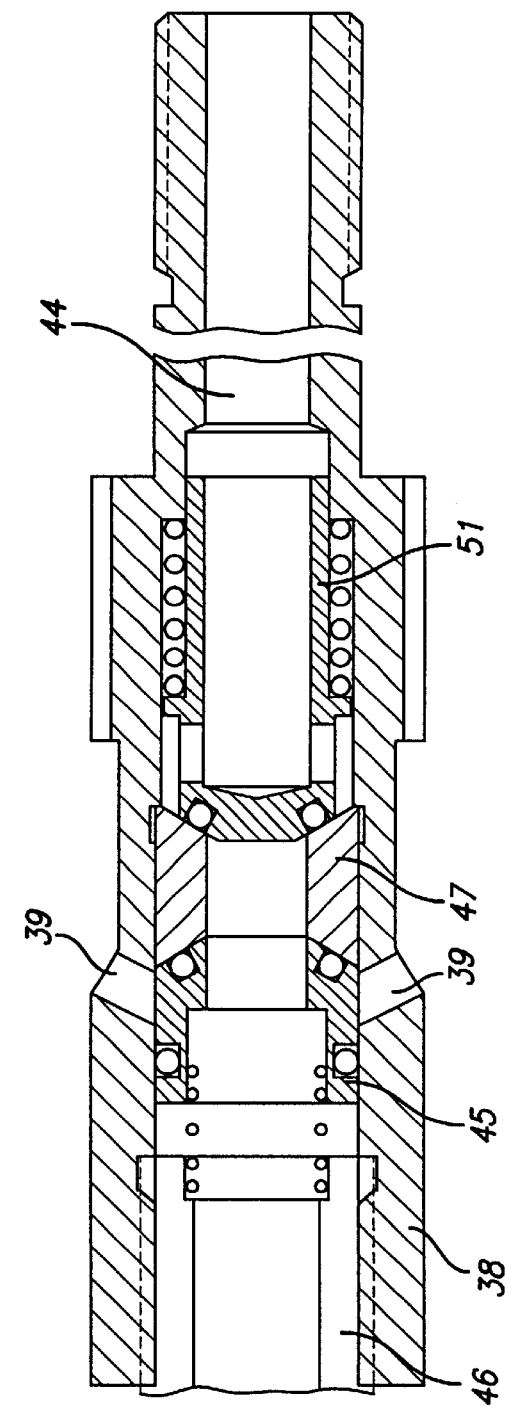
FIG. 8 is a detailed cross section view of a portion of the machine tool quill spindle assembly depicted in FIG. 1.

Referring now specifically to FIG. 8, the high pressure coolant in the hollow rod assembly 46 flows out the end of the hollow rod assembly 46, through a spring-loaded check valve 45, which is mounted proximate and end of the hollow rod assembly 46. The flow continues through a stop valve 47, which is mounted proximate the spring-loaded check valve 45, and abuts against a spring-loaded pressure relief piston 51, positioned proximate the stop valve 47. Once the fluid pressure against the relief piston 51 exceeds a predetermined setpoint, the relief piston 51 is unseated from the stop valve 47, allowing the fluid to flow through the opening 44 in the connector assembly 38. The fluid then flows out the connector assembly 38, into the clamp unit 42, and out to the installed cutting tool. This unidirectional coolant flow will continue as long as the controller is so programmed.

The low pressure coolant flow path in the quill spindle assembly 10 also begins at the adapter assembly 84. Low pressure coolant enters the adapter assembly 84 via the inlet port 92, flows around the outside of the tube 94, through the nipple 86, and into the rotary seal assembly 76. Within the rotary seal assembly 76, the low pressure coolant flows within the tubes 78, 85 and the flexible coupling tube 81, and around the outside of the tube 94. The low pressure coolant then exits the rotary seal assembly 76 and flows through the first coupling tube 74, also around the outside of the tube 94. Upon exiting the first coupling tube 74, the low pressure coolant is directed, via a plurality of flow paths 73, 75, into a coolant channel 77 formed between the inner periphery of the spline shaft 56 and the outer periphery of the draw shaft 48. The low pressure coolant then flows through the coolant channel 77, enters the spindle opening 36 and flows around the outside of the hollow rod assembly 46 and the connector assembly 38.

With specific reference now to FIG. 8, the connector assembly 38 includes a plurality of openings 39 that extend from a periphery thereof into the connector assembly 38, thus providing a fluid path into which the low pressure coolant flows. The low pressure coolant then acts on one side of the spring-loaded check valve 45 installed within the connector assembly 38. As shown, the other side of the check valve 45 is installed at the outlet of the hollow rod assembly 46 and, as a result, has the high pressure coolant flow path acting on this side of the check valve 45. Thus, if high pressure coolant is being supplied to an installed cutting tool, low pressure coolant will not unseat the check valve 45. Instead, low pressure coolant will circulate within the spindle assembly 14 by means of thermal influences and the centrifugal force imparted to the fluid during spindle assembly 14 rotation. This internal fluid circulation provides cooling to internal portions of the spindle assembly 14, including the upper and lower bearing assembly 16 inner races. Alternatively, if high pressure coolant is not being supplied to an installed cutting tool via the hollow rod assembly 46, then the low pressure coolant will unseat the check valve 45. Thus, the low pressure coolant will flow into the hollow rod assembly 46. Thereafter, and returning once again to FIGS. 1 and 2, the low pressure coolant within the hollow rod assembly 46 flows out the spindle assembly 14, and into the draw shaft 48. From there the low pressure coolant flows into the tube 94 and out the inlet/outlet port 88, returning to the unillustrated coolant supply source.

Figure 9:
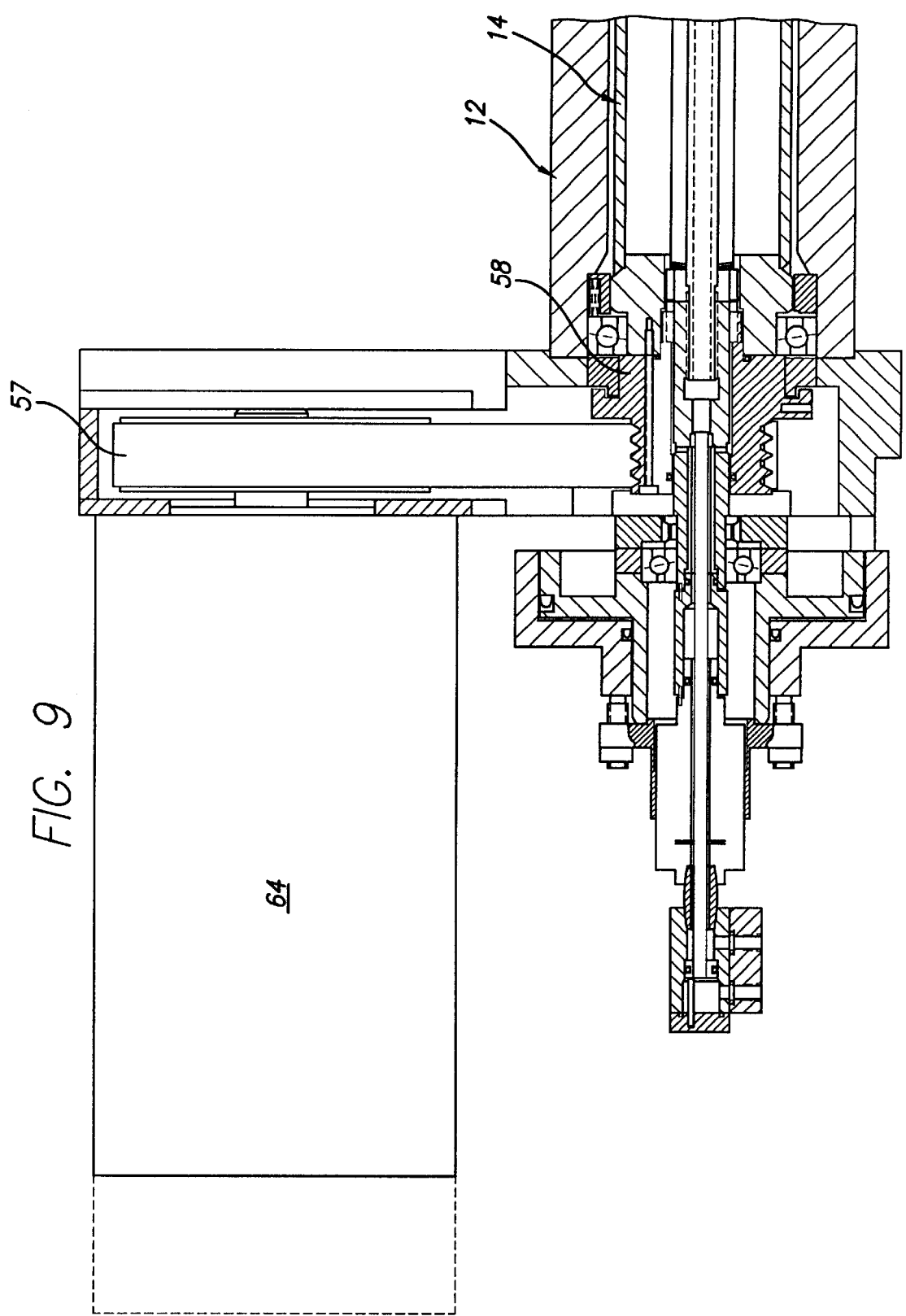
FIG. 9 is a cross section view of an upper portion of a machine tool quill spindle assembly according to an alternative embodiment of the present invention.

In the embodiment depicted in FIGS. 1 and 2, the spindle motor 64 is coupled to the spline shaft 56 and is mounted to a portion of the machine tool assembly. In an alternate embodiment, partially depicted in FIG. 9, the spindle motor 64 is mounted to the quill assembly 12, instead of the machine tool assembly. Thus, the spline shaft 56 and all of the components associated therewith are not needed with this embodiment, and the pulley assembly 58 is mounted directly to the spindle assembly 14.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A machine tool quill spindle assembly for holding machine tool cutting tools, comprising:
    a quill assembly;
    a spindle assembly, including a tool end and a machine end, rotationally mounted within said quill assembly for rotating a tool attached to its tool end;
    a plurality of spindle coolant flow paths extending axially within and through said spindle assembly to allow a cooling fluid to circulate within and through said spindle assembly;
    a hollow rod assembly extending axially within said spindle assembly and having a first end fixedly mounted proximate the machine end of said spindle assembly, and having a second end fixedly mounted proximate the tool end of said spindle assembly, said hollow rod assembly having an inner portion forming a portion of a first of said plurality of spindle coolant flow paths and an outer portion surrounded by a portion of a second of said plurality of spindle coolant flow paths;
    a check valve assembly, having a first side and a second side, mounted within said spindle assembly and positioned proximate the second end of said hollow rod assembly, the first side of said check valve assembly being in fluid communication with the first of said plurality of spindle coolant flow paths and the second side of said check valve assembly being in fluid communication with the second of said plurality of spindle coolant flow paths;
    a spindle pulley coupled to the machine end of said spindle assembly;
    a motor coupled to said quill assembly;
    a belt wound around said spindle pulley and a motor pulley coupled to a rotor of said motor;
    a rotary seal assembly coupled to the machine end of said spindle assembly, said rotary seal assembly including at least first and second coolant flow ports;
    a hollow tube assembly having a first end fixedly coupled within said rotary seal assembly proximate said first coolant flow port so that coolant directed into said first coolant flow port flows into an inside portion of said hollow tube assembly, and having a second end fixedly coupled proximate said hollow rod assembly so that the inside portion of said hollow tube assembly is in fluid communication with the inner portion of said hollow rod assembly; and
    a coolant channel in fluid communication with said second coolant flow port and the second of said plurality of spindle coolant flow paths,
    wherein the first of said plurality of spindle coolant flow paths provides cooling fluid to a cutting tool installed on the tool end of said spindle assembly, and wherein the second of said plurality of spindle coolant flow paths provides cooling fluid proximate bearing assemblies that rotationally mount said spindle assembly within said quill assembly.

2. A machine tool quill spindle assembly for holding machine tool cutting tools, comprising:
    a quill assembly;
    a spindle assembly, including a tool end and a machine end, rotationally mounted within said quill assembly for rotating a tool attached to its tool end;
    a plurality of spindle coolant flow paths extending axially within and through said spindle assembly to allow a cooling fluid to circulate within and through said spindle assembly;
    a hollow rod assembly extending axially within said spindle assembly and having a first end fixedly mounted proximate the machine end of said spindle assembly, and having a second end fixedly mounted proximate the tool end of said spindle assembly, said hollow rod assembly having an inner portion forming a portion of a first of said plurality of spindle coolant flow paths; and
    a check valve assembly, having a first side and a second side, mounted within said spindle assembly and positioned proximate the second end of said hollow rod assembly, the first side of said check valve assembly being in fluid communication with the first of said plurality of spindle coolant flow paths and the second side of said check valve assembly being in fluid communication with the second of said plurality of spindle coolant flow paths.

3. The quill spindle assembly of claim 2, wherein the first of said plurality of spindle coolant flow paths provides cooling fluid to a cutting tool installed on the tool end of said spindle assembly.

4. The quill spindle assembly of claim 2, further comprising:

a plurality of bearing assemblies that rotationally mount said spindle assembly within said quill assembly, wherein the second of said plurality of spindle coolant flow paths provides cooling fluid proximate to said bearing assemblies.

5. The quill spindle assembly of claim 2, further comprising:

a hollow spline shaft having a first end coupled to the machine end of said spindle assembly and having an outer periphery with a plurality of slots;

a pulley assembly surrounding at least an outer portion of said spline shaft and having an inner periphery with a plurality of slots; and a plurality of resilient keys individually inserted into collocated slots on the outer periphery of said spline shaft and the inner periphery of said pulley assembly for coupling said hollow spline shaft and said pulley assembly together.

6. The quill spindle assembly of claim 5, further comprising:

a hollow draw shaft mounted within and extending axially along said spline shaft, and having a first end surrounding at least a portion of the first end of said hollow rod assembly;

a rotary seal assembly coupled to a second end of said spline shaft, said rotary seal assembly including at least a first and a second coolant flow port;

a hollow tube assembly having a first end fixedly coupled within said rotary seal assembly proximate said first coolant flow port so that coolant directed into said first coolant flow port flows into an inside portion of said hollow tube assembly, and having a second end coupled within an inner portion of a second end of said hollow draw shaft so that the inside portion of said hollow tube assembly is in fluid communication, via said hollow draw shaft, with the inner portion of said hollow rod assembly.

7. The quill spindle assembly of claim 6, further comprising:

a first tubular portion rotationally mounted in a first end of said rotary seal assembly and extending partially into and toward a central portion of said rotary seal assembly;

a second tubular portion rotationally mounted in a second end of said rotary seal assembly and extending partially and toward a central portion of said rotary seal assembly; and a flexible tube coupled between and interconnecting said first and second tubular portions, wherein said first and second tubular portions and said flexible tube all surround at least a portion of said hollow tube assembly.

8. The quill spindle assembly of claim 6, further comprising:

a coolant channel providing fluid communication between said second coolant flow port and the second of said plurality of spindle coolant flow paths.

9. The quill spindle assembly of claim 8, wherein said coolant channel extends from said second coolant flow port into said spindle assembly, and is formed:

(i) in said rotary seal between an outer surface of said hollow tube and an inner surface of said rotary seal assembly; and (ii) in said spline shaft between an outer surface of said draw shaft and an inner surface of said spline shaft.

10. The quill spindle assembly of claim 2, further comprising:

a spindle pulley coupled to the machine end of said spindle assembly;

a motor coupled to said quill assembly; and a belt wound around said spindle pulley and a motor pulley coupled to a rotor of said motor.

11. The quill spindle assembly of claim 10, further comprising:

a rotary seal assembly coupled to the machine end of said spindle assembly, said rotary seal assembly including at least first and second coolant flow ports;

a hollow tube assembly having a first end fixedly coupled within said rotary seal assembly proximate said first coolant flow port so that coolant directed into said first coolant flow port flows into an inside portion of said hollow tube assembly, and having a second end fixedly coupled proximate said hollow rod assembly so that the inside portion of said hollow tube assembly is in fluid communication with the inner portion of said hollow rod assembly.

12. The quill spindle assembly of claim 1, further comprising:

a first tubular portion rotationally mounted proximate first end of said rotary seal assembly and extending partially into and toward a central portion of said rotary seal assembly;

a second tubular portion rotationally mounted proximate a second end of said rotary seal assembly and extending partially into and toward a central portion of said rotary seal assembly; and a flexible tube coupled between and interconnecting said first and second tubular portions, wherein said first and second tubular portions and said flexible tube all surround at least a portion of said hollow tube assembly.

13. The quill spindle assembly of claim 11, further comprising:

a coolant channel in fluid communication with said second coolant flow port and the second of said plurality of spindle coolant flow paths.

14. The quill spindle assembly of claim 13, wherein said coolant channel extends from said second coolant flow port into said spindle assembly, and is formed in said rotary seal between an outer surface of said hollow tube and an inner surface of said rotary seal assembly.

15. The quill spindle assembly of claim 2, further comprising:

a plurality of quill coolant flow paths extending axially within and through said quill assembly to allow a cooling fluid to circulate within and through said quill assembly.

16. The quill spindle assembly of claim 15, wherein a portion of said plurality of quill coolant flow paths provides cooling fluid to external portions of a cutting tool installed on the tool end of said quill spindle assembly.

17. The quill spindle assembly of claim 15, wherein a portion of said plurality of quill coolant flow paths provides cooling fluid proximate bearing assemblies that rotationally mount said spindle assembly.

18. An adjustable quill bearing for retaining and stabilizing a machine tool quill spindle assembly in a head assembly having a generally cylindrical central bore for receiving the machine tool quill spindle assembly therein, comprising:

a substantially cylindrical upper bearing portion which encircles a first portion of the quill spindle assembly;

an upper substantially tapered elongate surface extending from said upper bearing portion for mating with a substantially tapered elongate inner surface formed in an upper portion of the head assembly, said upper substantially tapered elongate surface including a groove formed on an inner surface thereof;

a substantially cylindrical lower bearing portion which encircles a second portion of the quill spindle assembly;

a lower substantially tapered elongate surface extending from said lower bearing portion for mating with a substantially tapered elongate inner surface formed in a lower portion of the head assembly, said lower substantially tapered elongate surface including a groove formed on an inner surface thereof; and a resilient, self-lubricating bearing material disposed within each of said grooves, said bearing material providing a frictional interference fit between the head assembly and the machine tool quill spindle.

19. The adjustable quill bearing of claim 18, wherein said resilient, self-lubricating bearing material is bonded in said groove.

20. The adjustable quill bearing of claim 18, further comprising:

a plurality of fastener openings extending through each of said upper and lower bearing portions for receiving a threaded fastener which extends into a collocated threaded opening in the head assembly.

21. In a machining center including a combination of a machine tool spindle and a head assembly having a central bore for receiving the machine tool spindle therein, the combination comprising:

a quill assembly;

a spindle assembly, including a tool end and a machine end, rotationally mounted within said quill assembly for rotating a tool attached to its tool end;

a plurality of spindle coolant flow paths extending axially within and through said spindle assembly to allow a cooling fluid to circulate within and through said spindle assembly; and an adjustable quill bearing interposed between a portion of said quill assembly and said head assembly, said adjustable quill bearing comprising:

a substantially cylindrical upper bearing portion which encircles a first portion of the quill spindle assembly;

an upper substantially tapered elongate surface extending from said upper bearing portion for mating with a substantially tapered elongate inner surface formed in an upper portion of the head assembly, said upper substantially tapered elongate surface including a groove formed on an inner surface thereof;

a substantially cylindrical lower bearing portion which encircles a second portion of the quill spindle assembly;

a lower substantially tapered elongate surface extending from said lower bearing portion for mating with a substantially tapered elongate inner surface formed in a lower portion of the head assembly, said lower substantially tapered elongate surface including a groove formed on an inner surface thereof; and a resilient, self-lubricating bearing material disposed within each of said grooves, said bearing material providing a frictional interference fit between the bead assembly and the machine tool quill spindle.

22. The combination of claim 21, further comprising:

a hollow rod assembly extending axially within said spindle assembly and having a first end fixedly mounted proximate the machine end of said spindle assembly, and having a second end fixedly mounted proximate the tool end of said spindle assembly, said hollow rod assembly having an inner portion forming a portion of a first of said plurality of spindle coolant flow paths and an outer portion surrounded by a portion of a second of said plurality of spindle coolant flow paths; and a check valve assembly, having a first side and a second side, mounted within said spindle assembly and positioned proximate the second end of said hollow rod assembly, the first side of said check valve assembly being in fluid communication with the first of said plurality of spindle coolant flow paths and the second side of said check valve assembly being in fluid communication with the second of said plurality of spindle coolant flow paths.

23. The quill spindle assembly of claim 22, wherein the first of said plurality of spindle coolant flow paths provides cooling fluid to a cutting tool installed on the tool end of said spindle assembly.

24. The quill spindle assembly of claim 22, further comprising:

a plurality of bearing assemblies that rotationally mount said spindle assembly within said quill assembly, wherein the second of said plurality of spindle coolant flow paths provides cooling fluid proximate to said bearing assemblies.

25. The combination of claim 22, further comprising:

a hollow spline shaft having a first end coupled to the machine end of said spindle assembly and having an outer periphery with a plurality of slots;

a pulley assembly surrounding at least an outer portion of said spline shaft and having an inner periphery with a plurality of slots; and a plurality of resilient keys individually inserted into collocated slots on the outer periphery of said spline shaft and the inner periphery of said pulley assembly for coupling said hollow spline shaft and said pulley assembly together.

26. The combination of claim 25, further comprising:

a hollow draw shaft mounted within and extending axially along said spline shaft, and having a first end surrounding at least a portion of the first end of said hollow rod assembly;

a rotary seal assembly coupled to a second end of said spline shaft, said rotary seal assembly including at least a first and a second coolant flow port;

a hollow tube assembly having a first end fixedly coupled within said rotary seal assembly proximate said first coolant flow port so that coolant directed into said first coolant flow port flows into an inside portion of said hollow tube assembly, and having a second end coupled within an inner portion of a second end of said hollow draw shaft so that the inside portion of said hollow tube assembly is in fluid communication, via said hollow draw shaft, with the inner portion of said hollow rod assembly.

27. The combination of claim 26, further comprising:

a first tubular portion rotationally mounted in a first end of said rotary seal assembly and extending partially into and toward a central portion of said rotary seal assembly;

a second tubular portion rotationally mounted in a second end of said rotary seal assembly and extending partially and toward a central portion of said rotary seal assembly; and a flexible tube coupled between and interconnecting said first and second tubular portions, wherein said first and second tubular portions and said flexible tube all surround at least a portion of said hollow tube assembly.

28. The combination of claim 26, further comprising:

a coolant channel in fluid communication with said second coolant flow port and the second of said plurality of spindle coolant flow paths.

29. The combination of claim 28, wherein said coolant channel extends from said second coolant flow port into said spindle assembly, and is formed:

(i) in said rotary seal between an outer surface of said hollow tube and an inner surface of said rotary seal assembly; and (ii) in said spline shaft between an outer surface of said draw shaft and an inner surface of said spline shaft.

30. The combination of claim 22, further comprising:

a spindle pulley coupled to the machine end of said spindle assembly;

a motor coupled to said quill assembly; and a belt wound around said spindle pulley and a motor pulley coupled to a rotor of said motor.

31. The combination of claim 30, further comprising:

a rotary seal assembly coupled to the machine end of said spindle assembly, said rotary seal assembly including at least first and second coolant flow ports;

a hollow tube assembly having a first end fixedly coupled within said rotary seal assembly proximate said first coolant flow port so that coolant directed into said first coolant flow port flows into an inside portion of said hollow tube assembly, and having a second end fixedly coupled proximate said hollow rod assembly so that the inside portion of said hollow tube assembly is in fluid communication with the inner portion of said hollow rod assembly.

32. The combination of claim 30, further comprising:

a first tubular portion rotationally mounted proximate first end of said rotary seal assembly and extending partially into and toward a central portion of said rotary seal assembly;

a second tubular portion rotationally mounted proximate a second end of said rotary seal assembly and extending partially into and toward a central portion of said rotary seal assembly; and a flexible tube coupled between and interconnecting said first and second tubular portions, wherein said first and second tubular portions and said flexible tube all surround at least a portion of said hollow tube assembly.

33. The quill spindle assembly of claim 30, further comprising:

a coolant channel in fluid communication with said second coolant flow port and the second of said plurality of spindle coolant flow paths.

34. The combination of claim 33, wherein said coolant channel extends from said second coolant flow port into said spindle assembly, and is formed in said rotary seal between an outer surface of said hollow tube and an inner surface of said rotary seal assembly.

35. The quill spindle assembly of claim 21, further comprising:

a plurality of quill coolant flow paths extending axially within and through said quill assembly to allow a cooling fluid to circulate within and through said quill assembly.

36. The quill spindle assembly of claim 35, wherein a portion of said plurality of quill coolant flow paths provides cooling fluid to external portions of a cutting tool installed on the tool end of said spindle assembly.

37. The quill spindle assembly of claim 35, wherein a portion of said plurality of quill coolant flow paths provides cooling fluid proximate bearing assemblies that rotationally mount said spindle assembly.

38. A machine tool quill spindle assembly for holding machine tool cutting tools, comprising:

a quill assembly;

a spindle assembly, including a tool end and a machine end, rotationally mounted within said quill assembly for rotating a tool attached to its tool end;

a plurality of spindle coolant flow paths extending axially within and through said spindle assembly to allow a cooling fluid to circulate within and through said spindle assembly;

a hollow rod assembly extending axially within said spindle assembly and having a first end fixedly mounted proximate the machine end of said spindle assembly, and having a second end fixedly mounted proximate the tool end of said spindle assembly, said hollow rod assembly having an inner portion forming a portion of a first of said plurality of spindle coolant flow paths and an outer portion surrounded by a portion of a second of said plurality of spindle coolant flow paths;

a check valve assembly, having a first side and a second side, mounted within said spindle assembly and positioned proximate the second end of said hollow rod assembly, the first side of said check valve assembly being in fluid communication with the first of said plurality of spindle coolant flow paths and the second side of said check valve assembly being in fluid communication with the second of said plurality of spindle coolant flow paths;

a hollow spline shaft having a first end coupled to the machine end of said spindle assembly and having an outer periphery with a plurality of slots;

a pulley assembly surrounding at least an outer portion of said spline shaft and having an inner periphery with a plurality of slots; and a plurality of resilient keys individually inserted into collocated slots on the outer periphery of said spline shaft and the inner periphery of said pulley assembly for coupling said hollow spline shaft and said pulley assembly together;

a hollow draw shaft mounted within and extending axially along said spline shaft, and having a first end surrounding at least a portion of the first end of said hollow rod assembly;

a rotary seal assembly coupled to a second end of said spline shaft, said rotary seal assembly including at least a first and a second coolant flow port;

a hollow tube assembly having a first end fixedly coupled within said rotary seal assembly proximate said first coolant flow port so that coolant directed into said first coolant flow port flows into an inside portion of said hollow tube assembly, and having a second end coupled within an inner portion of a second end of said hollow draw shaft so that the inside portion of said hollow tube assembly is in fluid communication, via said hollow draw shaft, with the inner portion of said hollow rod assembly; and a coolant channel in fluid communication with said second coolant flow port and the second of said plurality of spindle coolant flow paths, wherein the first of said plurality of spindle coolant flow paths provides cooling fluid to a cutting tool installed on the tool end of said spindle assembly, and wherein the second of said plurality of spindle coolant flow paths provides cooling fluid proximate bearing assemblies that rotationally mount said spindle assembly within said quill assembly.

39. The quill spindle assembly of claim 38, further comprising:

a first tubular portion rotationally mounted in a first end of said rotary seal assembly and extending partially into and toward a central portion of said rotary seal assembly;

a second tubular portion rotationally mounted in a second end of said rotary seal assembly and extending partially and toward a central portion of said rotary seal assembly; and a flexible tube coupled between and interconnecting said first and second tubular portions, wherein said first and second tubular portions and said flexible tube all surround at least a portion of said hollow tube assembly.

40. The quill spindle assembly of claim 38, wherein said coolant channel extends from said second coolant flow port into said spindle assembly, and is formed:

(i) in said rotary seal between an outer surface of said hollow tube and an inner surface of said rotary seal assembly; and (ii) in said spline shaft between an outer surface of said draw shaft and an inner surface of said spline shaft.

41. The quill spindle assembly of claim 38, further comprising:

a plurality of quill coolant flow paths extending axially within and through said quill assembly to allow a cooling fluid to circulate within and through said quill assembly.

42. The quill spindle assembly of claim 1, further comprising:

a plurality of quill coolant flow paths extending axially within and through said quill assembly to allow a cooling fluid to circulate within and through said quill assembly.

43. The quill spindle assembly of claim 1, further comprising:

a first tubular portion rotationally mounted proximate first end of said rotary seal assembly and extending partially into and toward a central portion of said rotary seal assembly;

a second tubular portion rotationally mounted proximate a second end of said rotary seal assembly and extending partially into and toward a central portion of said rotary seal assembly; and a flexible tube coupled between and interconnecting said first and second tubular portions, wherein said first and second tubular portions and said flexible tube all surround at least a portion of said hollow tube assembly.

44. The quill spindle assembly of claim 1 wherein said coolant channel extends from said second coolant flow port into said spindle assembly, and is formed in said rotary seal between an outer surface of said hollow tube and an inner surface of said rotary seal assembly.

* * * * *